L. JONES.
TOOTHED GEARING.
APPLICATION FILED JULY 30, 1920.
1,383,402.
Patented July 5, 1921.
4 SHEETS—SHEET 1.
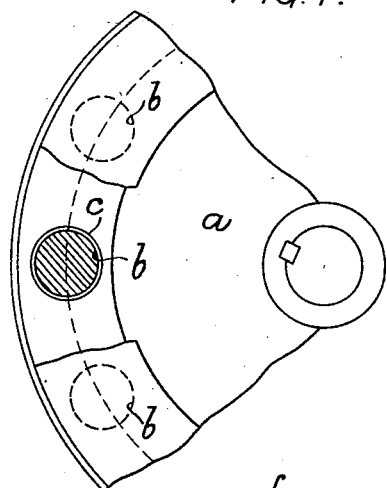
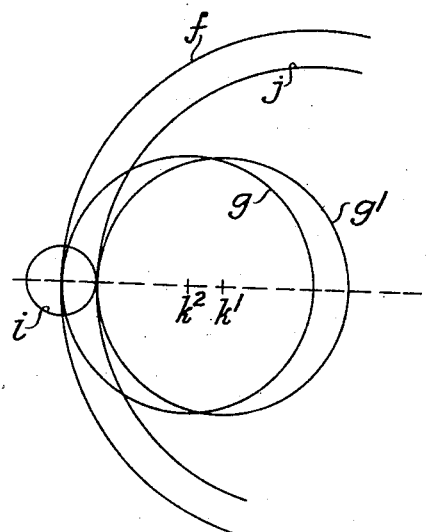
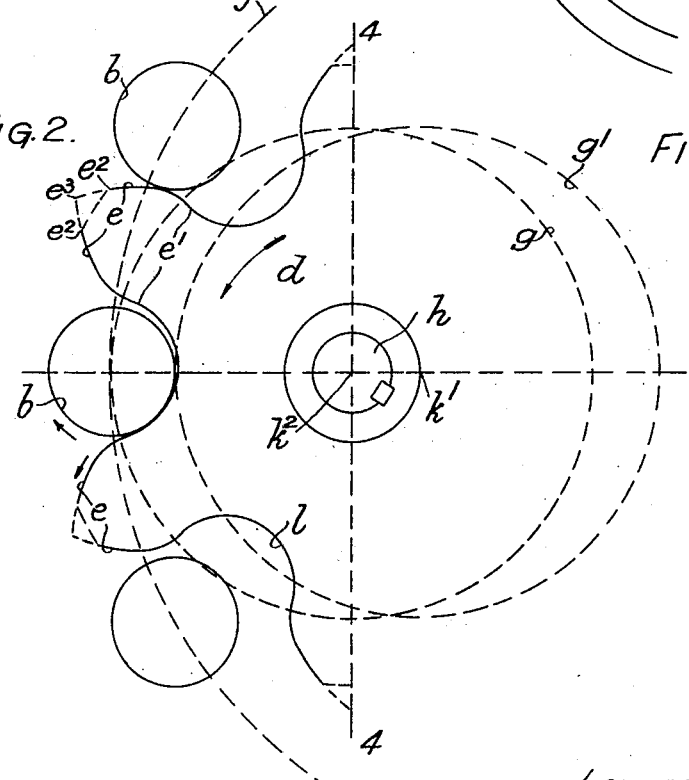
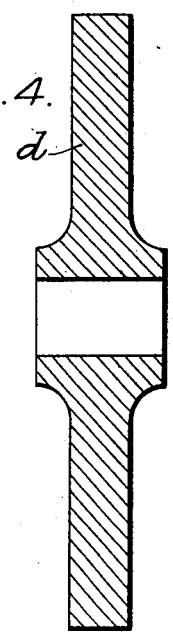
Inventor
Lemuel Jones
by Wm Wallace White
Attorney

UNITED STATES PATENT OFFICE.

LEMUEL JONES, OF AYLESBURY, ENGLAND.

TOOTHED GEARING.

1,383,402.  Specification of Letters Patent.  Patented July 5, 1921.

Application filed July 30, 1920. Serial No. 400,042.

*To all whom it may concern:*

Be it known that I, LEMUEL JONES, subject of the King of Great Britain, residing at The School House, Bierton, Aylesbury, in the county of Bucks, England, have invented new and useful Improvements in or Relating to Toothed Gearing, of which the following is a specification.

This invention relates to toothed gearing of the kind in which one of the pair of gear elements is roller-toothed, and more particularly the invention relates to the formation of the crown parts of the tooth curve of the other element for meshing with the roller toothed element, and to the position for mounting this form of element to mesh correctly with such roller toothed elements.

The object of the present invention is to obtain an element with the crown parts of the tooth engaging surfaces self generated by the rollers of its companion gear element, and thus reduce gear friction. With internally geared wheels to which such element as a pinion is particularly applicable, centrifugally impelled self-lubrication of all the gearing and gear-bearing surfaces can be utilized to aid the natural tendency of a gear-wheel roller to roll with and over its respective pinion tooth engaging surface, and thus further reduce and minimize gear friction.

According to the present invention, a roller as a gearing member under the above conditions, is utilized as the generator of the tooth profile or engaging surface of the crown parts of the teeth of the companion element, hereinafter referred to as the "tooth curve" and consequently such a tooth curve will tend to keep true to shape when in use.

In designing this tooth curve, a circle of the diameter of a gearing roller of the roller toothed element, as the generator, is rolled around a circle or along a line tangential with the pitch circle or pitch line of the toothed element with the center of the generating circle constantly on a remoter circle or line equivalent to the pitch circle or pitch line of the axes of the rollers of the roller toothed element, thus differentiating it from ordinary epicyclic and hypocyclic toothed curves generated by rolling a generating circle along the pitch circle of each element.

The invention will now be described with reference to the accompanying drawing in which:—

Figure 1 is a part side elevation of an internal gear wheel $a$, in which rollers $b$ mounted in cylindrical housings $c$ are employed in the place of teeth.

Fig. 2 is a part side elevation on a larger scale of a pinion $d$ to illustrate the present invention.

Fig. 3 is a diagram on the same scale as Fig. 1.

Fig. 4 is a transverse section of the pinion $d$ on the line 4—4 of Fig. 2 and on the same scale.

$b, b$ (Fig. 2) are two gear wheel rollers in position meshing with two of the teeth $e$ of the pinion $d$, meshing internally with the wheel $a$. $f$ is the pitch circle of the gear wheel, $g$ is the pitch circle of the pinion $d$, and $h$ is the shaft on which the pinion is mounted.

A gear wheel roller $b$ being accommodated in a cylindrical housing $c$ which closely approximates to it in diameter as shown in Fig. 1, then such gear wheel roller $b$ Figs. 1 and 2 has its axis continuously on the pitch circle $f$ of its gear wheel $a$, and the pinion tooth curve required for meshing correctly with such a gear wheel roller $b$ under these conditions is, according to the present invention, generated by such gear wheel roller $b$. $e^1$ to $e^3$ Fig. 2 is such a curve, herein referred to as the "tooth curve", and Fig. 3 illustrates how this pinion tooth curve may be obtained, and how the pinion $d$ is to be mounted to obtain its correct meshing position.

By rolling a generator $i$, which in this invention is a circle (Fig. 3) of the diameter of a gear wheel roller $b$, around a circle $j$ which is of less diameter than the pitch circle $f$ of the wheel $a$ by the diameter of the generator $i$, an epicyclic curve is obtained for a pinion whose pitch circle $g^1$ has its center at $k^1$ Fig. 3. In Fig. 2 this pinion pitch circle $g^1$ would have its center at $k^1$.

Figure 8:
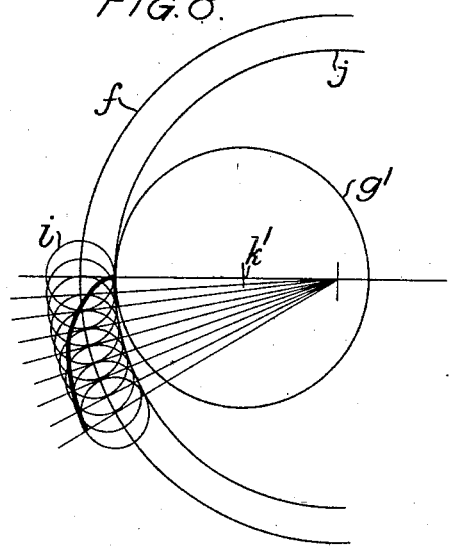
Fig. 8 is a diagram corresponding to Fig. 3, showing the generation of the tooth curve of a pinion for meshing internally with a roller toothed wheel.

Fig. 8 shows the generation of the tooth curve, the first portion only of which is used.

Having provided the pinion teeth with pinion tooth curves shaped accordingly as shown at $e^1$—$e^2$, Fig. 2, to mesh correctly with their gear wheel $a$, the pinion $d$ must be mounted so that its axis and the axis of its shaft $h$ Fig. 2 is at $k^2$ Figs. 2 and 3, and not at $k^1$ Figs. 2 and 3.

Fig. 2 shows the upper complete pinion tooth $e$ at its first engaging contacts, and the lower complete tooth at its disengaging position. From this illustration it will be seen that all engagement at or near the end of a pinion tooth is eliminated, and that as engagement is restricted to the crown parts of the tooth curve, it is only necessary to shape and continue the pinion tooth curve surface into a bottom clearance, such as an arc-like recess $l$, Fig. 2.

The pinion teeth $e$ of pinions such as $d$ are intended to be formed in metals that will take a high degree of finish and polish to work agreeably and smoothly in meshing with hardened polished metallic rollers $b$ of their gear wheels.

A pinion tooth $e$ may end at $e^2$, Fig. 2, as indicated by the dotted line $e^2$ to $e^2$ of this figure.

A roller $b$ in passing through engagement has a tendency to roll with and over its respective self-generated pinion tooth curve surface $e^1$—$e^2$, as indicated by the arrows in Fig. 2, consequently this natural conforming action of two smoothly fashioned meshing elements will reduce gear friction; and in internally geared wheels gear friction can be further minimized by centrifugally impelled self-lubrication of all meshing surfaces.

The form of gear elements referred to, the method of forming the teeth of their companion elements, and the method of assembling such elements to mesh together, as described in the present specification, are adaptable to various gear ratios both for speed multiplying and speed reducing purposes, without restriction as to the number of teeth provided.

Figure 9:
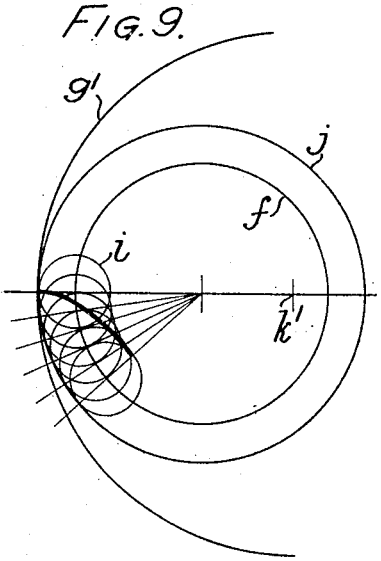
Fig. 9 is a diagram showing the generation of the tooth curve of a wheel with which a roller toothed pinion is to mesh internally.

As shown in Fig. 9, the internal gear wheel may have teeth having tooth curves formed according to the present invention while the pinion has the rollers.

Figures 10, 11:
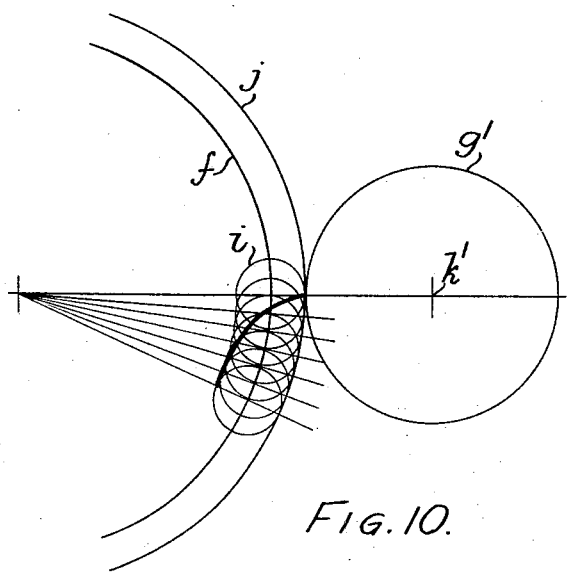
Fig. 10 is a diagram showing the generation of the tooth curve of a pinion for meshing externally with a roller toothed wheel.
Fig. 11 is a diagram showing the generation of the tooth curve of a wheel with which a roller toothed pinion is to mesh externally.

The gearing may be external, in which case the tooth curve for a pinion is generated as shown in Fig. 10, while the tooth curve for a wheel is generated as shown in Fig. 11.

Figure 12:
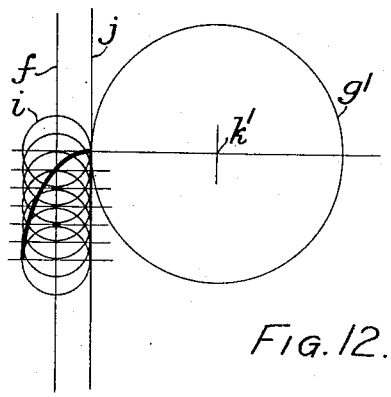
Fig. 12 is a diagram showing the generation of the tooth curve of a pinion for meshing with a roller toothed rack.
Figure 13:
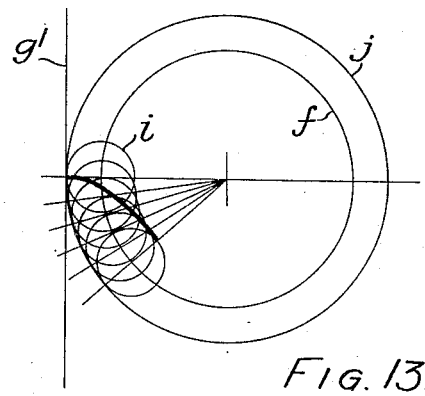
Fig. 13 is a diagram showing the generation of the tooth curve of a rack with which a roller toothed pinion is to mesh.

The wheel may be developed into a rack, which may be considered to be a wheel of infinite radius. Fig. 12 shows the generation of the tooth curve of the pinion when the rollers are on the rack, and Fig. 13 shows the generation of the tooth curve of the rack, when the rollers are on the pinion. It will be noticed that the circles $j$ and $f$, or $g^1$ as the case may be, become straight lines.

Figure 14:
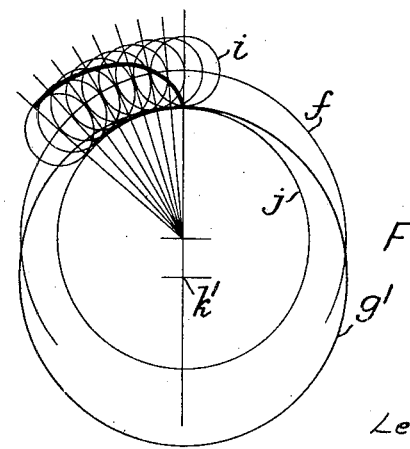
Fig. 14 is a diagram showing the generation of the tooth curve of a sprocket wheel with which a roller chain is to mesh.

As a further development, a roller pitch chain may be employed instead of a roller toothed wheel, which chain may be considered to be a wheel having its pitch circle coincident with that of the pinion or sprocket wheel. The generation of the tooth curve for such sprocket wheel is shown in Fig. 14. The circle $j$ along which the generator $i$ rolls is, in this case, of less diameter than the pitch circle $g^1$ of the pinion or sprocket wheel, by the amount of the diameter of the generator $i$, while the circle $f$ traversed by the center of the generator $i$ is of the same diameter as the pitch circle $g^1$ of the pinion.

With a chain however it is necessary in use to conserve the coincidence of the pitch circle of the rollers wrapping the pinion with the pitch circle of the pinion.

Figures 5, 6:
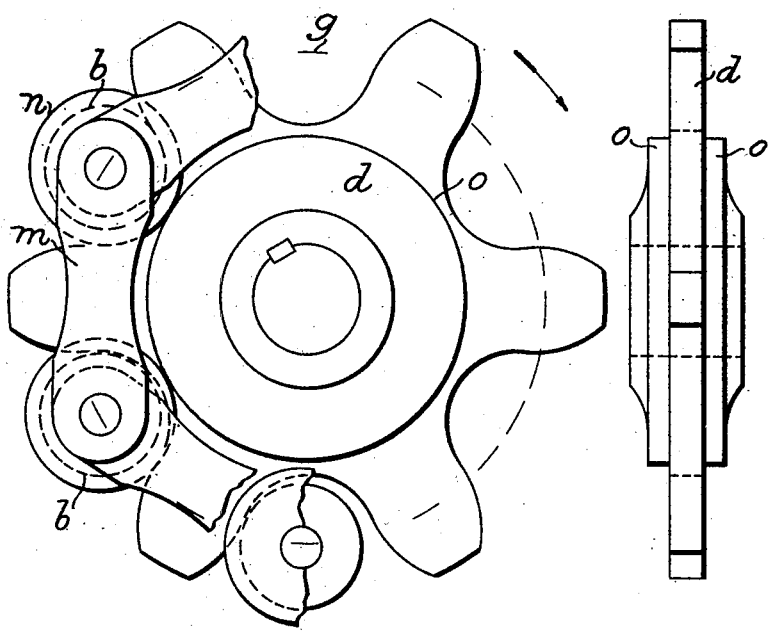
Fig. 5 is a side elevation of a pinion, meshing as a sprocket wheel with a pitch chain.
Fig. 6 is an edge view thereof.
Figure 7:
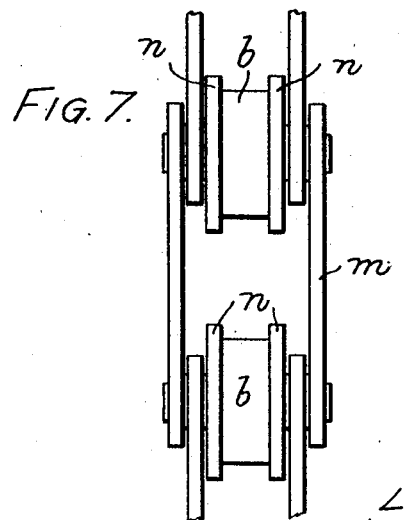
Fig. 7 is a plan of a portion of the chain.

For this reason, as shown in Figs. 5–7, the rollers $b$ of the chain $m$ may have lateral flanges $n$, which bear against central bosses $o$ of the pinion $d$, and support the rollers $b$ against drawing into the bottom clearances $l$ between the roots of the teeth.

I claim:

1. A method of forming the engaging surfaces of and mounting a toothed element to mesh with a roller-toothed element, consisting in generating the crown parts of the engaging surfaces of said teeth by rolling a generating circle of the diameter of said rollers along a line tangential with the pitch line of said toothed element with the center of said generating circle constantly on a remoter line equivalent to the pitch line of the axes of said rollers of the roller toothed element, and mounting said toothed element with its pitch line tangential to the pitch line of the axes of said rollers.

2. A method of forming the engaging surfaces of and mounting a toothed element to mesh with a roller-toothed element, consisting in generating the crown parts of the engaging surfaces of said teeth by rolling a generating circle of the diameter of said rollers around a circle tangential with the pitch circle of said toothed element with the center of said generating circle constantly on a remoter circle equivalent to the pitch circle of the axes of said rollers, and mounting said toothed element with its pitch circle tangential to the pitch circle of the axes of said rollers.

3. A method of forming the engaging surfaces of and mounting a toothed pinion to mesh internally with a roller-toothed wheel, consisting in generating the crown parts of the engaging surfaces of said teeth by rolling a generating circle of the diameter of said rollers around a circle tangential with the pitch circle of said pinion with the center of said generating circle constantly on a remoter circle equivalent to the pitch circle of the axes of said rollers, and mounting said pinion with its pitch circle internally tangential to the pitch circle of the axes of said rollers.

In testimony whereof I have signed my name to this specification.

LEMUEL JONES.